(12) United States Patent
Daco et al.

(10) Patent No.: US 12,331,412 B2
(45) Date of Patent: Jun. 17, 2025

(54) MODULAR ELECTROLYZER SYSTEM

(71) Applicant: Bloom Energy Corporation, San Jose, CA (US)

(72) Inventors: Christian Daco, San Jose, CA (US); Jessica Mahler, San Jose, CA (US); Samuel Juday, San Jose, CA (US); Ross Parker, San Jose, CA (US); Cory McClintic, San Jose, CA (US); Ryan Johnson, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 18/151,740

(22) Filed: Jan. 9, 2023

(65) Prior Publication Data

US 2023/0399762 A1     Dec. 14, 2023

Related U.S. Application Data

(60) Provisional application No. 63/297,615, filed on Jan. 7, 2022, provisional application No. 63/297,680, filed on Jan. 7, 2022, provisional application No. 63/297,671, filed on Jan. 7, 2022, provisional application No. 63/297,648, filed on Jan. 7, 2022.

(51) Int. Cl.
| | |
|---|---|
| *C25B 9/00* | (2021.01) |
| *C25B 1/042* | (2021.01) |
| *C25B 9/70* | (2021.01) |
| *C25B 15/027* | (2021.01) |
| *C25B 15/08* | (2006.01) |
| *H01M 8/18* | (2006.01) |

(52) U.S. Cl.
CPC ........... *C25B 15/027* (2021.01); *C25B 1/042* (2021.01); *C25B 9/70* (2021.01); *C25B 15/08* (2013.01); *H01M 8/186* (2013.01)

(58) Field of Classification Search
CPC ......... C25B 15/027; C25B 1/042; C25B 9/70; C25B 15/08; H01M 8/186
See application file for complete search history.

(56) References Cited

U.S. PATENT DOCUMENTS

| | | | |
|---|---|---|---|
| 2013/0108939 A1 | 5/2013 | Besse et al. | |
| 2014/0251796 A1 | 9/2014 | Hauschild et al. | |
| 2016/0260996 A1* | 9/2016 | Trevisan | H01M 8/249 |
| 2018/0069253 A1* | 3/2018 | Chatroux | H01M 8/2425 |
| 2018/0131018 A1* | 5/2018 | Perry | H01M 8/04201 |

FOREIGN PATENT DOCUMENTS

| | | | | |
|---|---|---|---|---|
| EP | 4086370 A2 | | 11/2022 | |
| JP | 2020128576 | * | 8/2020 | ............... C25B 1/04 |
| KR | 20180036859 | * | 4/2018 | .......... H01M 16/003 |
| KR | 20180076284 A | | 7/2018 | |

OTHER PUBLICATIONS

Search Report issued Jun. 19, 2023 in corresponding European Patent Application No. 23151735.0.

* cited by examiner

*Primary Examiner* — Zulmariam Mendez
(74) *Attorney, Agent, or Firm* — THE MARBURY LAW GROUP PLLC

(57) ABSTRACT

A modular electrolyzer system, comprising a plurality of generator modules, each of the plurality of generator modules including a hotbox, and a gas distribution module configured to supply hydrogen to each of the plurality of generator modules.

17 Claims, 10 Drawing Sheets

500

700

MODULAR ELECTROLYZER SYSTEM

FIELD

The embodiments of the present invention are generally directed toward electrolyzer systems including solid oxide electrolyzer cells (SOEC) and methods of operating the same, and more particularly toward installing and maintaining the same.

BACKGROUND

Solid oxide fuel cells (SOFC) can be operated as an electrolyzer in order to produce hydrogen and oxygen, referred to as solid oxide electrolyzer cells (SOEC). In SOFC mode, oxide ions are transported from the cathode side (air) to the anode side (fuel) and the driving force is the chemical gradient of partial pressure of oxygen across the electrolyte. In SOEC mode, a positive potential is applied to the air side of the cell and the oxide ions are now transported from the fuel side to the air side. Since the cathode and anode are reversed between SOFC and SOEC (i.e. SOFC cathode is SOEC anode, and SOFC anode is SOEC cathode), the SOFC cathode (SOEC anode) may be referred to as the air electrode, and the SOFC anode (SOEC cathode) may be referred to as the fuel electrode. During SOEC mode, water in the fuel stream is reduced ($H_2O+2e^- \rightarrow O^{2-}+H_2$) to form $H_2$ gas and $O^{2-}$ ions, $O^{2-}$ ions are transported through the solid electrolyte, and then oxidized on the air side ($O^{2-}$ to $O_2$) to produce molecular oxygen. Since the open circuit voltage for a SOFC operating with air and wet fuel (hydrogen, reformed natural gas) is on the order of 0.9 to 1V (depending on water content), the positive voltage applied to the air side electrode in SOEC mode raises the cell voltage up to typical operating voltages of 1.1 to 1.3V.

Rapid and inexpensive installation can help to increase the prevalence of SOFC/SOEC systems. Installation costs for pour in place custom designed concrete pads, which generally require trenching for plumbing and electrical lines, can become cost prohibitive. Installation time also is a problem in the case of most sites since concrete pours and trenches generally require one or more building permits and building inspector reviews. Common system installations include construction techniques, such as use of conduit, hard-piped trenched plumbing with stub-ups, concrete anchors for seismic tie-down, and the like.

Furthermore, stationary SOFC/SOEC systems may be installed in location where the cost of real estate is quite high or the available space is limited (e.g., a loading dock, a narrow alley, or space between buildings, etc.). SOFC/SOEC system installation should have a high utilization of available space. When a considerable amount of stand-off space is required for access to the system via doors and the like, installation real estate costs can increase significantly.

When the number of SOFC/SOEC systems to be installed on a site increases, one problem which generally arises is that stand-off space between these systems is required (to allow for maintenance of one unit or the other unit). The space between systems is lost in terms of its potential to be used by the customer of the system.

In the case of some SOFC system designs, these problems are resolved by increasing the overall capacity of the monolithic system design. However, this creates new challenges as the size and weight of the concrete pad required increases. Therefore, this strategy tends to increase the system installation time. Furthermore, as the minimum size of the system increases, the fault tolerance of the design is reduced.

The fuel cell/electrolyzer stacks or columns of the systems are usually located in hot boxes (i.e., thermally insulated containers). The hot boxes of existing large stationary fuel cell/electrolyzer systems are housed in cabinets, housings, or enclosures. The terms cabinet, enclosure, and housing are used interchangeably herein. The cabinets are usually made from metal. The metal is painted with either automotive or industrial powder coat paint, which is susceptible to scratching, denting and corrosion. Most of these cabinets are similar to current industrial HVAC equipment cabinets.

SUMMARY

Accordingly, the present invention is directed to a modular electrolyzer system that substantially obviates one or more problems due to limitations and disadvantages of the related art.

An object of the present invention is to provide an electrolyzer modular block site kits for rapid deployment.

Another object of the present invention is to provide a large site stamp architecture.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Reference will now be made in detail to the embodiments of the present invention, examples of which are illustrated in the accompanying drawings. It is to be understood that both the foregoing general description and the following detailed description are examples, and are not restrictive of the invention as claimed.

Figure 1:
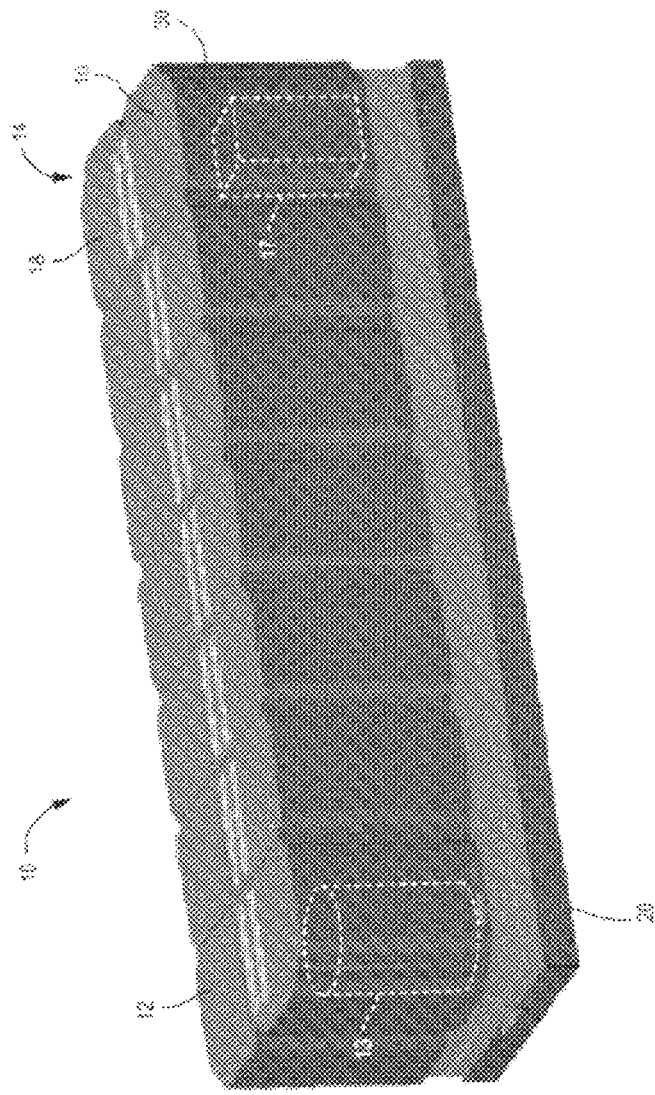
FIG. 1 illustrates a SOFC/SOEC modular system according to an example embodiment of the present invention.

FIG. 1 illustrates a SOFC/SOEC modular system 10 according to an example embodiment of the present invention.

The modular design of the SOFC/SOEC system 10 provides flexible system installation and operation. By contrast to prior modular systems, the embodiments use above ground routing for plumbing and electrical outing to increase the speed of installation and maintenance, and to reduce cost. In addition, the need of special tradespeople for installation is reduced. Modules allow scaling of installed generating capacity, reliable generation of power, flexibility of fuel processing, and flexibility of power output voltages and frequencies with a single design set. The modular design results in an "always on" unit with very high availability and reliability, and also provides an improved means of maintenance and scale-up. The modular design also enables the use of available fuels and required voltages and frequencies that may vary by customer and/or by geographic region.

The SOFC/SOEC modular system 10 includes a housing 14 in which at least one of generator modules 12 (preferably a plurality, generator module 12 also referred to as "SGM"), one or more fuel processing modules 16, and one or more power conditioning modules 18 (i.e., electrical output, also referred to a generator module or "SPM") are disposed. In embodiments, the power conditioning modules 18 are configured to deliver direct current (DC). In alternative embodiments, the power conditioning modules 18 are configured to deliver alternating current (AC). In these example embodiments, the power conditioning modules 18 may include a mechanism to convert DC to AC, such as an inverter. For example, the system 10 may include any desired number of modules, such as 2-30 generator modules, 3-12 generator modules, 6-12 modules, or other large site configuration of generator modules.

The example system 10 of FIG. 1 includes six generator modules 12 (one row of six modules stacked side to side), one fuel processing module 16, and one power conditioning module 18 on a pad 20. The housing 14 may include a cabinet to house each module 12, 16, 18. Alternatively, modules 16 and 18 may be disposed in a single cabinet. While one row of generator modules 12 is shown, the system may include more than one row of modules 12. For example, the SOFC/SOEC system 10 may include two rows of generator modules 12 arranged back to back/end to end.

Each generator module 12 is configured to house one or more hot boxes 13. Each hot box contains one or more stacks or columns of fuel/electrolyzer cells (not shown for clarity), such as one or more stacks or columns of solid oxide fuel cells having a ceramic oxide electrolyte separated by conductive interconnect plates. Other fuel cell types, such as PEM, molten carbonate, phosphoric acid, etc. also may be used.

The fuel cell stacks may include externally and/or internally manifolded stacks. For example, the stacks may be internally manifolded for fuel and air with fuel and air risers extending through openings in the fuel cell layers and/or in the interconnect plates between the fuel cells.

Alternatively, the fuel cell stacks may be internally manifolded for fuel and externally manifolded for air, where only the fuel inlet and exhaust risers extend through openings in the fuel cell layers and/or in the interconnect plates between the fuel cells, as described in U.S. Pat. No. 7,713,649, which is incorporated herein by reference in its entirety. The fuel cells may have a cross flow (where air and fuel flow roughly perpendicular to each other on opposite sides of the electrolyte in each fuel cell), counter flow parallel (where air and fuel flow roughly parallel to each other but in opposite directions on opposite sides of the electrolyte in each fuel cell) or co-flow parallel (where air and fuel flow roughly parallel to each other in the same direction on opposite sides of the electrolyte in each fuel cell) configuration.

The modular fuel cell system 10 also contains at least one fuel processing module 16. The fuel processing module 16 includes components for pre-processing of fuel, such as adsorption beds (e.g., desulfurizer and/or other impurity adsorption) beds. The fuel processing module 16 may be designed to process a particular type of fuel. For example, the system may include a diesel fuel processing module, a natural gas fuel processing module, and an ethanol fuel processing module, which may be provided in the same or in separate cabinets. A different bed composition tailored for a particular fuel may be provided in each module. The processing module(s) 16 may process at least one of the following fuels selected from natural gas provided from a pipeline, compressed natural gas, methane, propane, liquid petroleum gas, gasoline, diesel, home heating oil, kerosene, JP-5, JP-8, aviation fuel, hydrogen, ammonia, ethanol, methanol, syn-gas, bio-gas, bio-diesel and other suitable hydrocarbon or hydrogen containing fuels. If desired, the fuel processing module 16 may include a reformer 17. Alternatively, if it is desirable to thermally integrate the reformer 17 with the fuel/electrolyzer cell stack(s), then a separate reformer 17 may be located in each hot box 13 in a respective generator module 12. Furthermore, if internally reforming fuel/electrolyzer cells are used, then an external reformer 17 may be omitted entirely.

The power conditioning module 18 includes components for converting the fuel cell stack generated DC power to AC power (e.g., DC/DC and DC/AC converters described in U.S. Pat. No. 7,705,490, incorporated herein by reference in its entirety), electrical connectors for AC power output to the grid, circuits for managing electrical transients, a system controller (e.g., a computer or dedicated control logic device or circuit). The power conditioning module 18 may be designed to convert DC power from the fuel cell modules to different AC voltages and frequencies. Designs for 208V, 60 Hz; 480V, 60 Hz; 415V, 50 Hz; and other common voltages and frequencies may be provided.

The fuel processing module 16 and the power conditioning module 18 may be housed in one cabinet of the housing 14. If a single input/output cabinet is provided, then modules 16 and 18 may be located vertically (e.g., power conditioning module 18 components above the fuel processing module 16 desulfurizer canisters/beds) or side by side in the cabinet.

As shown in the example embodiment in FIG. 1, one cabinet 14 is provided for one row of six generator modules 12, which are arranged linearly side to side on one side of the input/output module 14. The row of modules may be positioned, for example, adjacent to a building for which the system provides power (e.g., with the backs of the cabinets of the modules facing the building wall).

The linear array of generator modules 12 is readily scaled. For example, more or fewer generator modules 12 may be provided depending on the power needs of the building or other facility serviced by the fuel cell system 10. The generator modules 12 and input/output modules 14 may also be provided in other ratios. For example, in other exemplary embodiments, more or fewer generator modules 12 may be provided adjacent to the input/output module 14. Further, the support functions could be served by more than one input/output module 14 (e.g., with a separate fuel processing module 16 and power conditioning module 18 cabinets). Additionally, the input/output module 14 is at the end of the row of generator modules 12, it also can be located in the center of a row generator modules 12 or other location.

The SOFC/SOEC modular system 10 may be configured in a way to ease servicing of the components of the system 10. For example, the routinely or high serviced components (such as the consumable components) may be placed in a single module to reduce amount of time required for the service person. For example, a purge gas (optional) and desulfurizer material for a natural gas fueled system may be placed in a single module (e.g., a fuel processing module 16 or a combined input/output module 14 cabinet). This can be the only module cabinet accessed during routine maintenance. Thus, each module 12, 14, 16, and 18 can be serviced, repaired or removed from the system without opening the other module cabinets and without servicing, repairing or removing the other modules. In addition, plumbing and electrical components may be disposed above a steel overlay disposed between the concrete pad and the generator modules 12.

For example, as described above, the system 10 can include multiple generator modules 12. When at least one generator module 12 is taken off line (i.e., no power is generated by the stacks in the hot box 13 in the off line module 12), the remaining generator modules 12, the fuel processing module 16 and the power conditioning module 18 (or the combined input/output module 14) are not taken off line. Furthermore, the fuel cell system 10 may contain more than one of each type of module 12, 14, 16, or 18. When at least one module of a particular type is taken off line, the remaining modules of the same type are not taken off line.

Thus, in a system comprising a plurality of modules, each of the modules 12, 14, 16, or 18 may be electrically disconnected, removed from the fuel/electrolyzer cell modular system 10 and/or serviced or repaired without stopping an operation of the other modules in the system, allowing the fuel cell system to continue to generate electricity. The entire SOFC/SOEC modular system 10 does not have to be shut down if one stack of fuel cells in one hot box 13 malfunctions or is taken off line for servicing.

The modular system 10 may contain additional modules and components, such as those described in U.S. patent application Ser. No. 11/656,006, filed on Jan. 22, 2007, U.S. patent application Ser. No. 14/208,190, filed on Mar. 13, 2014, and U.S. patent application Ser. No. 15/061,673, filed on Mar. 4, 2016, each of which is incorporated herein by reference in its entirety.

Figure 2:
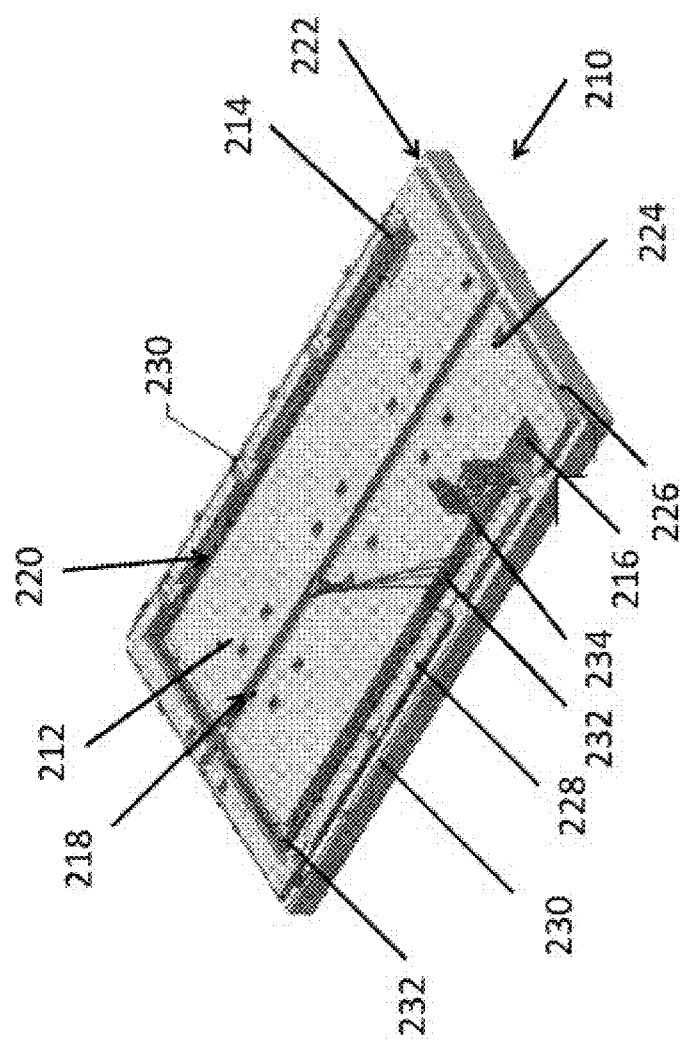
FIG. 2 illustrates a schematic top view of the pad according to an example embodiment of the present invention.

FIG. 2 illustrates a schematic top view of the pad 210 according to an example embodiment of the present invention.

Referring to FIG. 2, the pad 210 includes a base 212. The base 212 may be formed of a concrete or similar material. Alternatively, the base 212 may be made of any other suitable structural material, such as steel or another metal, and may be pre-cast as a single body or may be cast in sections. The base 212 may be made by casting the base material in a patterned mold, removing the cast base 212 from the mold, and then transporting the base 212 from the location of the mold (e.g., in a base fabrication facility) to the operation site of the fuel cell system (i.e., where the fuel cell system will be located to generate power). The base 212 may be configured as a single piece, or may include multiple connected sections.

The base 212 may include first and second through holes 214, 216, a drainage recess 218, a wiring recess 220, and a plumbing recess 222. The base 212 may also include tie-down pockets 224, tie-down inserts 226, and plumbing brackets 228.

In an example configuration, the drainage recess 218 may extend along the middle of the base 212, between the rows of modules, and may be configured to collect, for example, rain or debris collected on the base 212. The tie-down pockets 224 and tie-down inserts 226 may be configured to secure corresponding modules to the base 212. The plumbing recess 222 may extend around the perimeter of the base 212. In particular, the plumbing recess 222 may be formed along the perimeter of base 212 (e.g., or along three or more edges of the base 212). The wiring recess 220 may extend from the first through hole 214 to the second through hole 216, and may be generally U-shaped.

The pad 210 also can include plumbing 230, wiring 232, and a system electrical connection, such as a bus bar 234. In particular, the wiring 232 may be disposed in the wiring recess 220 and may be connected to one or more of the modules. For example, the wiring 232 may be connected to the bus bar 234 and each of the generator modules 12. The bus bar 234 may be connected to the power conditioning module 18. The power conditioning module 18 may be connected to an external load through the second through hole 216. The bus bar 234 may be disposed on an edge of the through hole 216, such that the wiring 232 does not extend across the through hole 216. However, the bus bar 234 may be disposed on an opposing side of the through hole 216, such that the wiring 232 does extend across the through hole 216, if such a location is needed to satisfy system requirements.

The plumbing 230 may be disposed in the plumbing recess 222. The plumbing 230 may be connected to an external source of water and/or fuel, via the first through hole 214, and may be attached to the plumbing brackets 228. In particular, the plumbing 230 may include a fuel pipe 230A connecting the fuel processing module 16 to the generator modules 12. The plumbing 230 also may include a water pipe 230B configured to provide water to the generator modules 12. The plumbing 230 may extend between the plumbing brackets 228 to the generator modules 12.

In order to quickly and securely connect individual modules of the modular system to one another, the embodiments utilize above ground routing that can be installed quickly and without highly specialized tradespeople. For example, the embodiments of the present invention utilize site kits for modular blocks (or "Building Blocks" defined as a generator module and one or more generator modules).

The electrolyzer system architecture is a modular approach to system construction, including various functions of the overall system into discrete modules. Each module is manufactured and installed as a separate module, but then can be connected to one another at a customer site. In an alternate embodiment, each modular block (e.g., one module and one or more generation modules) are preconfigured onto a skid and installed at the modular block level rather than at a modular level.

Figure 3:
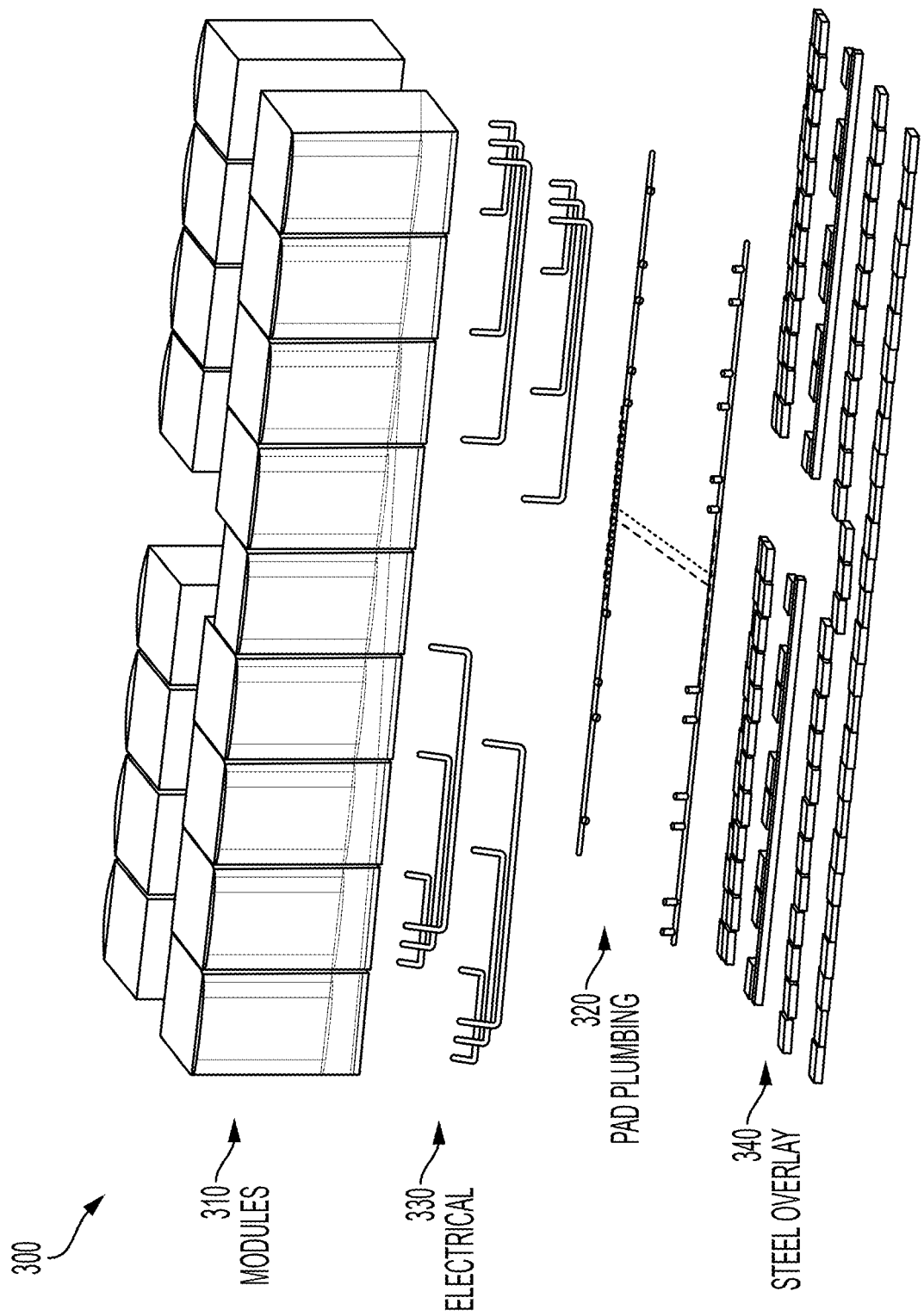
FIG. 3 illustrates a modular site kit according to an example embodiment of the present invention.

FIG. 3 illustrates a modular site kit 300 according to an example embodiment of the present invention.

As illustrated in FIG. 3, the modular site kit includes a steel overlay 340 on a base (e.g., base 212), a pad plumbing layer 320 (e.g., including piping), an electrical layer 330 (e.g., including wiring), and a modules layer 310. Here, any required stub-ups from site utilities for water, fuel, electrical, or controls can be provided at a single location of the base for the stamp (e.g., a group of modular blocks), reducing the need to prepare the site for each individual module or modular block that is installed onsite. In some configurations, for plumbing, additional subassemblies can be added to route water and gas from the stub-up location to the other modules.

Figure 4:
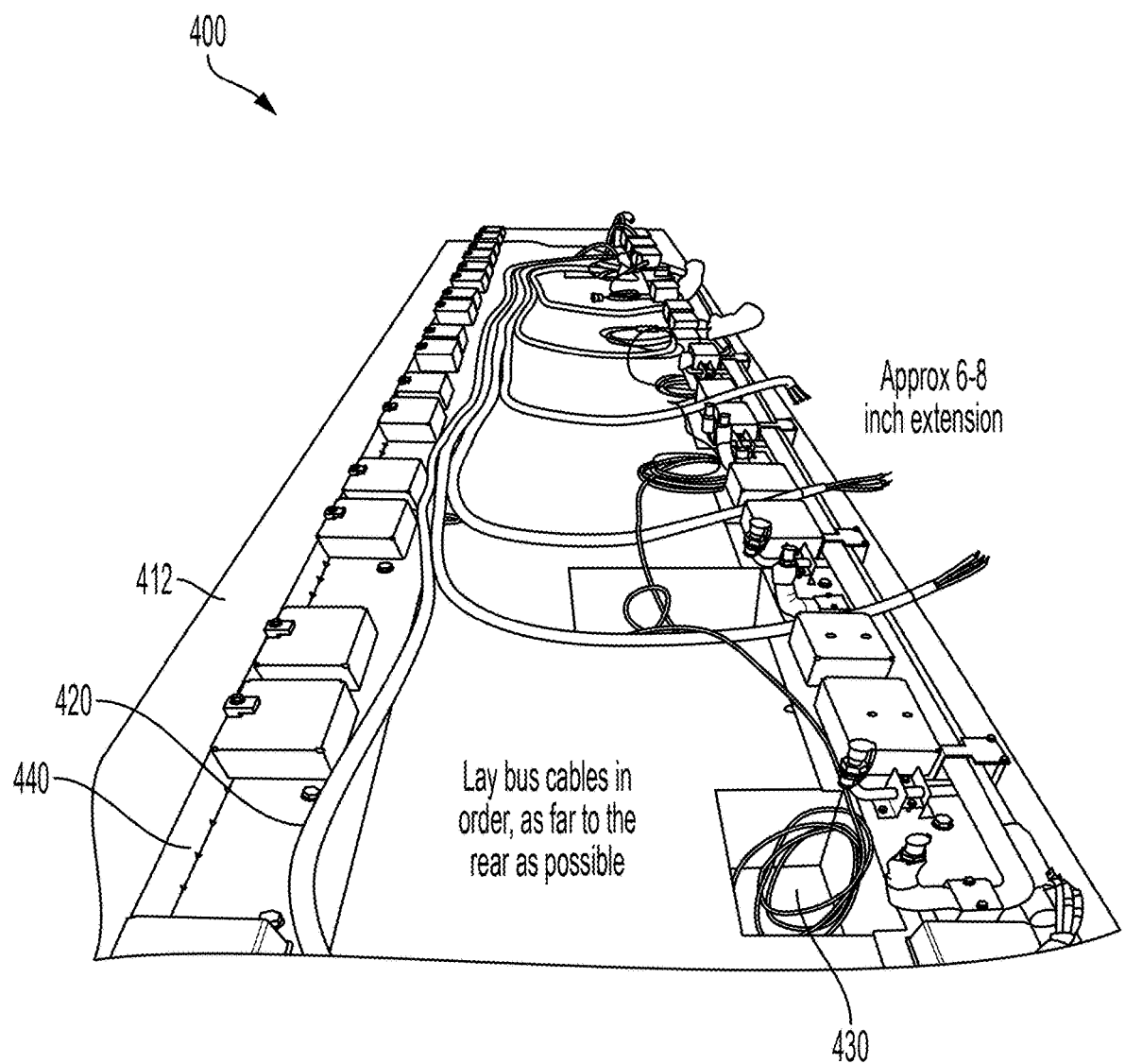
FIG. 4 illustrates an implementation of a modular site kit according to an example embodiment of the present invention.

FIG. 4 illustrates an implementation of a modular site kit 400 according to an example embodiment of the present invention. As illustrated in FIG. 4, modular site kit 400 includes a steel overlay 440 on a base 412, a plumbing layer 420, and an electrical layer 430. The modules layer is not illustrated in FIG. 4 so as to better depict the other components.

Figure 5:
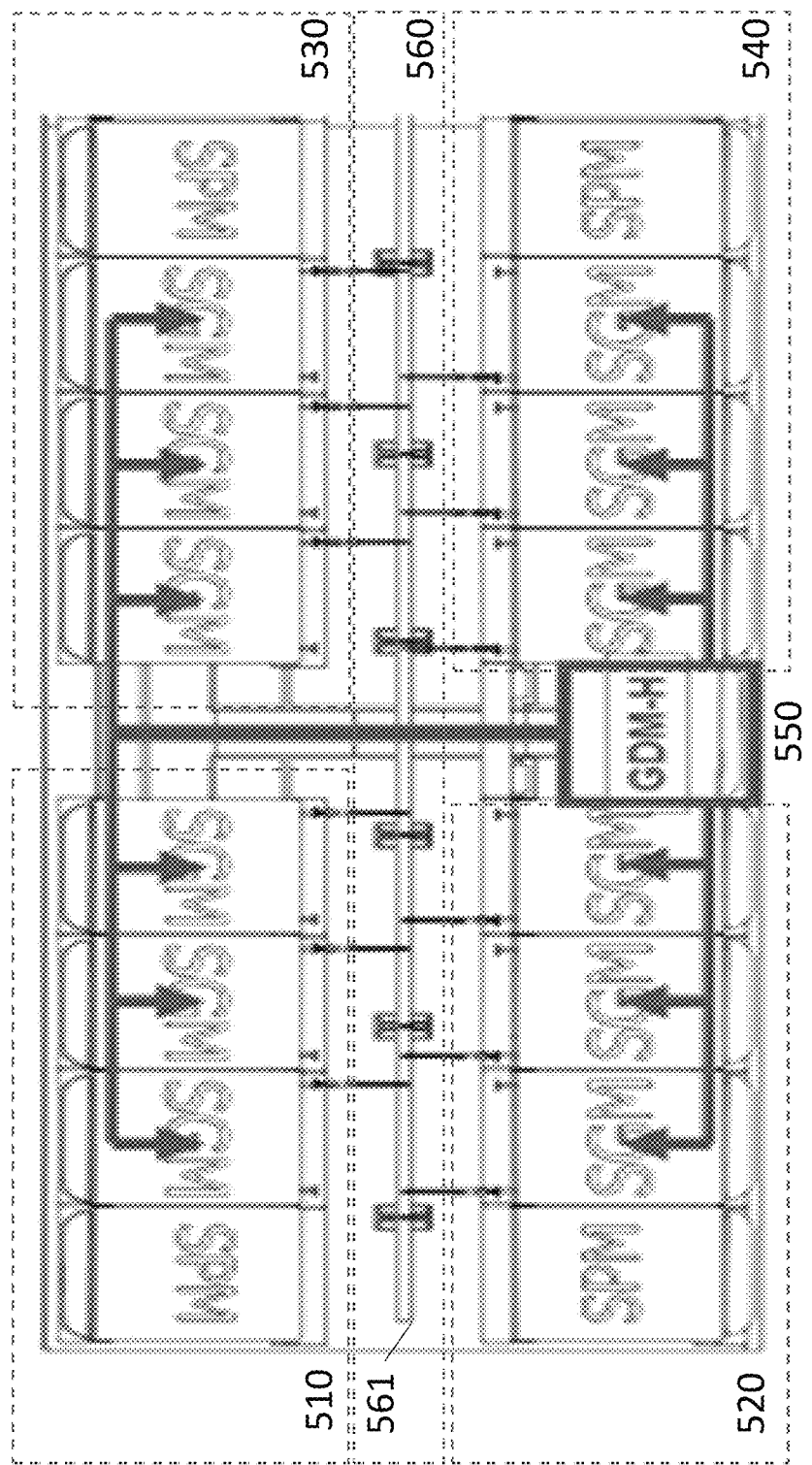
FIG. 5 illustrates a large site electrolyzer system according to an example embodiment of the present invention.

FIG. 5 illustrates a large site electrolyzer system 500 according to an example embodiment of the present invention.

The large-site electrolyzer system 500 includes a gas distribution module ("GDM") 550 that is configured to supply a plurality of modular blocks 510, 520, 530, 540 with start-up hydrogen. SOEC and SOFC systems generally require fresh hydrogen gas for start-up and shutdown. Gas distribution module 550 can further include a pressure detector, thermal detector, a gas safety shutoff, and a purge gas distributor.

As discussed above, each modular block incudes one power module ("SPM") and one or more generator modules ("SGM"), for example. A grouping of modular blocks into a collection of systems is referred to as a stamp. Thus, large site electrolyzer system 500 is a stamp. Because hydrogen is a flammable gas that is supplied to each SGM at pressure, a safe method of shutting off gas to a group of generator modules SGMs is needed if a safety event is detected. Thus, GDM 550 is configured to shut off hydrogen supplied to SGMs in the event that a safety event is detected. Safety designs, such as pressure detection, overpressure protection, and gas safety shutoff are readily applied within electrolyzer system 500 by GDM 550 and/or the fuel processing module (e.g., 16). In addition, a stamp level controller can be provided at GDM 550.

Although the grouping of four modular blocks 510, 520, 530, 540 is an example configuration, this configuration is an efficient grouping for gas safety. In addition, the grouping of four modular blocks 510, 520, 530, 540 is efficient for the collection of hydrogen product within servicing aisle 560. The piping 561 within servicing aisle 560 is configured to collect hydrogen product for integration with a downstream compression system. Piping 561 is configured to prevent condensate backflow into the generator modules SGMs. Condensate management also enables using various monitoring and control devices as well as piping to return to the water outlet (or BOP1).

Figure 6B:
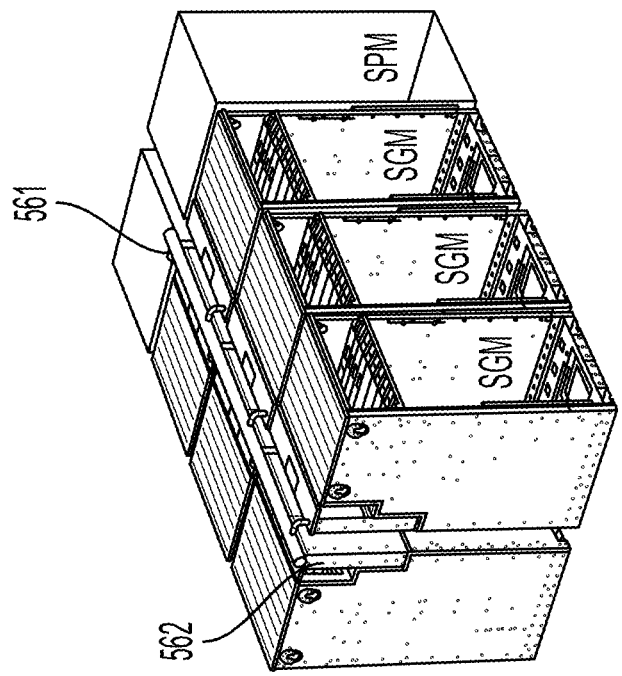
FIG. 6B illustrates a servicing aisle according to another example embodiment of the present invention.
Figure 6A:
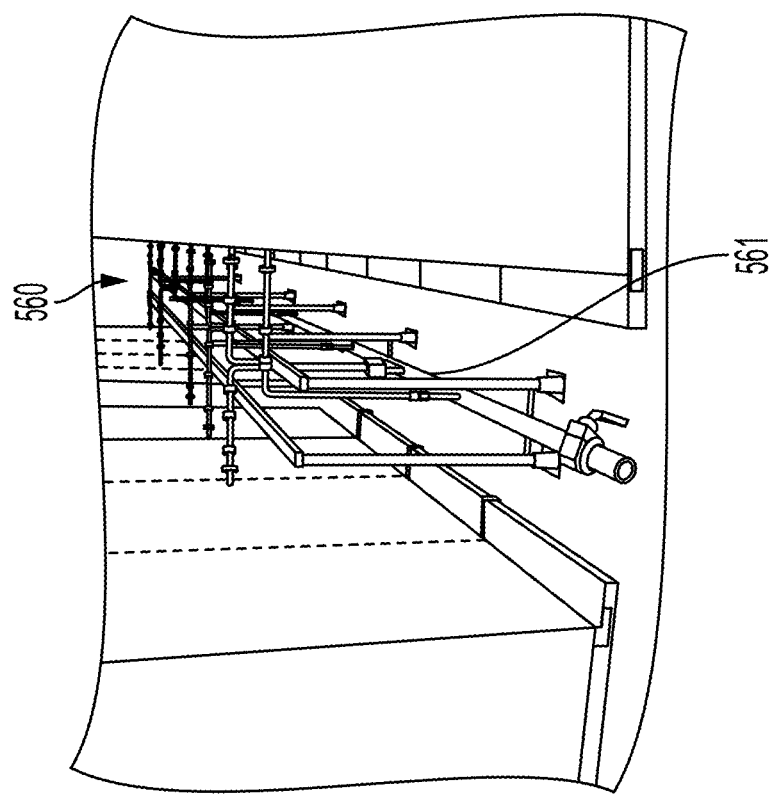
FIG. 6A illustrates a servicing aisle according to an example embodiment of the present invention.

FIG. 6A illustrates a servicing aisle 560 according to an example embodiment of the present invention. As illustrated in FIG. 6A, piping 561 is accessible in servicing aisle 560. Piping 561 may be coupled to a rear or upper surface of generator modules SGMs depending upon design and consideration of space availability. Servicing aisle 560 may have a width of 1 meter or 1.5 meters, for example. If the installation site cannot accommodate the space of servicing aisle 561, piping 561 can be configured overhead, as shown in FIG. 6B where servicing aisle is reduced to less than 30 centimeters, for example. Here, piping 561 is further heated by cathode exhaust of ventilation module 562, and internal condensate management is not needed. In another example, piping may be coupled to a rear surface of generator modules SGMs even when piping 561 is disposed overhead the generator modules SGMs. In other words, hydrogen outlet travels out a rear surface of the SGM and up to collection header piping 561. The rear surface can be configured with or without a junction box (e.g., 813).

Figure 7:
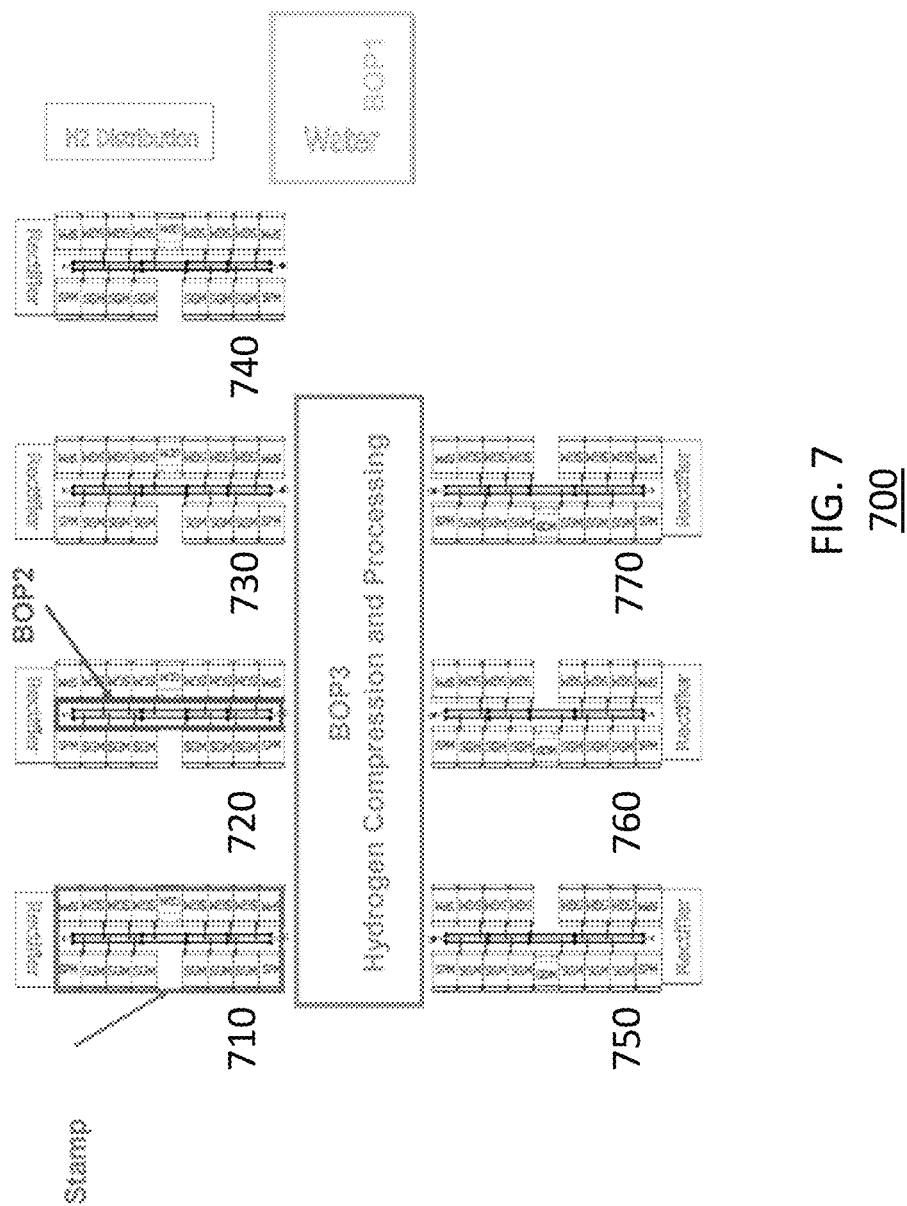
FIG. 7 illustrates a large site electrolyzer system according to another example embodiment of the present invention.

FIG. 7 illustrates a large site (e.g., a 10-megawatt system) electrolyzer system 700 according to an example embodiment of the present invention. As illustrated in FIG. 7, electrolyzer system 700 includes a plurality of stamps 710, 720, 730, 740, 750, 760, and 770. In addition, electrolyzer system 700 further includes additional balance of plant components, such as water source BOP1, hydrogen product collectors BOP2 (e.g., including piping 561), and hydrogen compression and processing BOP3. Hydrogen compression and processing BOP3 is functionally configured to supply hydrogen at pressure to the gas distribution module (e.g., GDM 550) of each respective stamp 710, 720, 730, 740, 750, 760, and 770. Thus, the stamp architecture can be repeated in a large site layout, using the repeated elements to build up to a large site installation.

Figure 8:
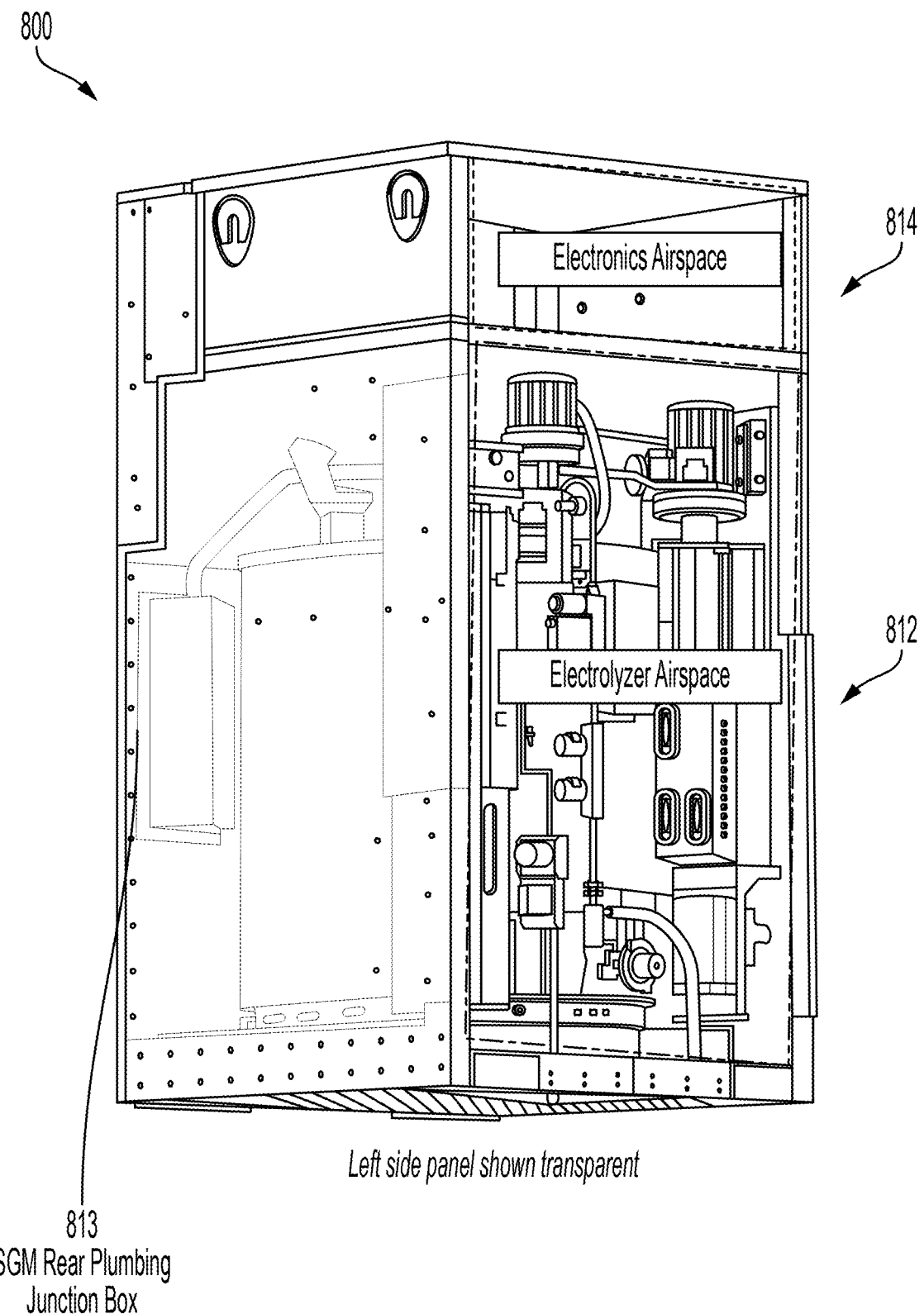
FIG. 8 illustrates a generator module according to an example embodiment of the present invention.

FIG. 8 illustrates a generator module 800 according to an example embodiment of the present invention.

As illustrated in FIG. 8, generator module 800 includes electrolyzer compartment 812 and electronics compartment 814. The separate compartments or regions for the electrolyzer and electronics facilitates the installation of the hydrogen generating element (i.e., the electrolyzer) as well as the accompanying electronic support systems. Within the housing of generator module 800, each of the electrolyzer and the electronic support systems are housed in air-space separated regions.

Internal physical separation of the electrolyzer compartment 812 and electrolyzer compartment 814 can be achieved using sheet metal, gaskets, cable glands, and the like. In some instances, the embodiments achieve and maintain air pressure differential between the electronics compartment 812 and electrolyzer compartment 814 by using ventilation fans.

Figure 9A:
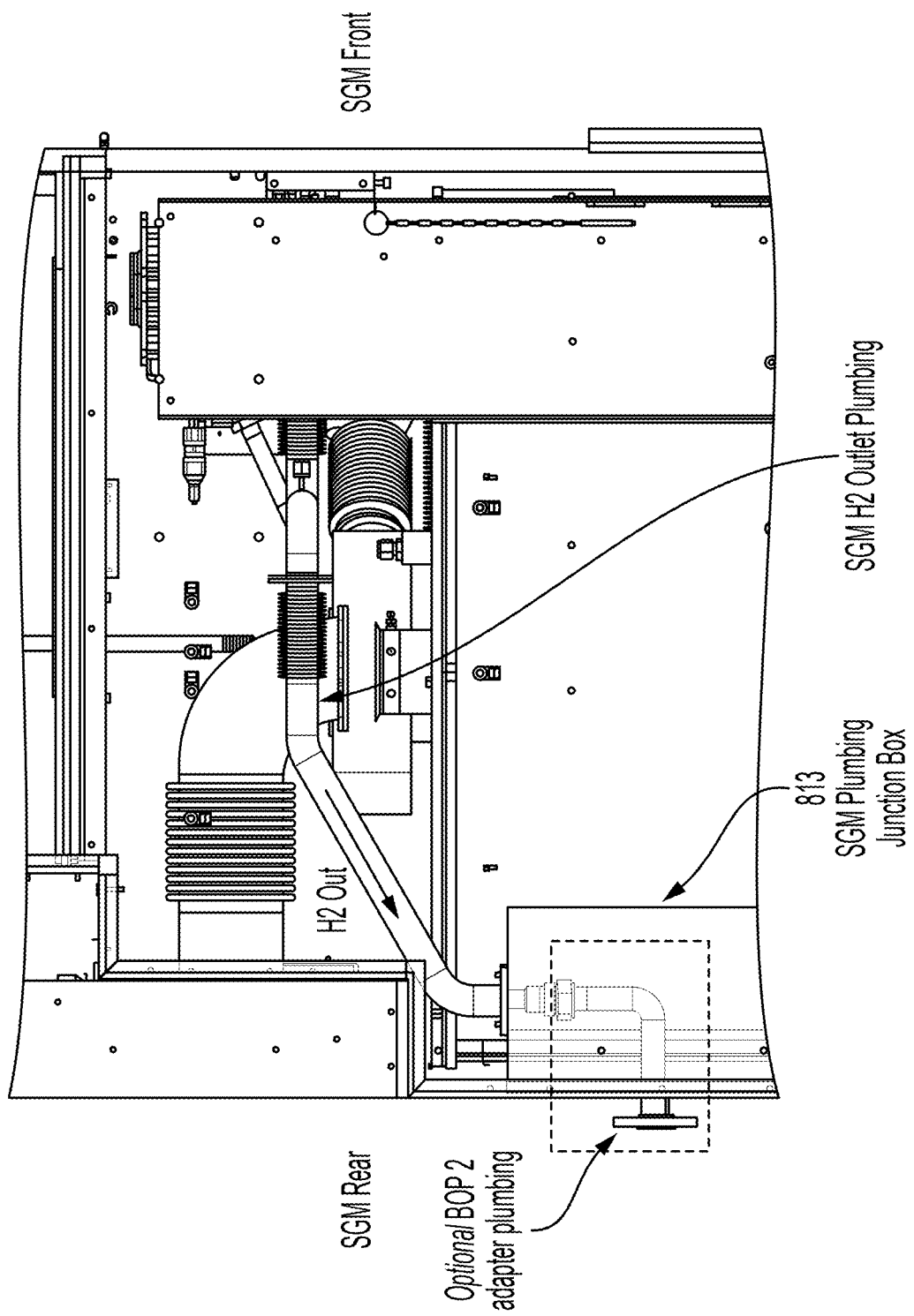
FIG. 9A illustrates outlet hydrogen product at rear plumbing junction box according to an example embodiment of the present invention.

Within electrolyzer compartment 812 can be rear plumbing junction box 813 that can be accessed via the servicing aisle (e.g., 560). In addition, hydrogen product can be outlet via rear plumbing junction box 813, and collected for integration with a downstream compression system via piping (e.g., piping 561). For example, FIG. 9A illustrates outlet hydrogen product at rear plumbing junction box 813 according to an example embodiment of the present invention.

Figure 9B:
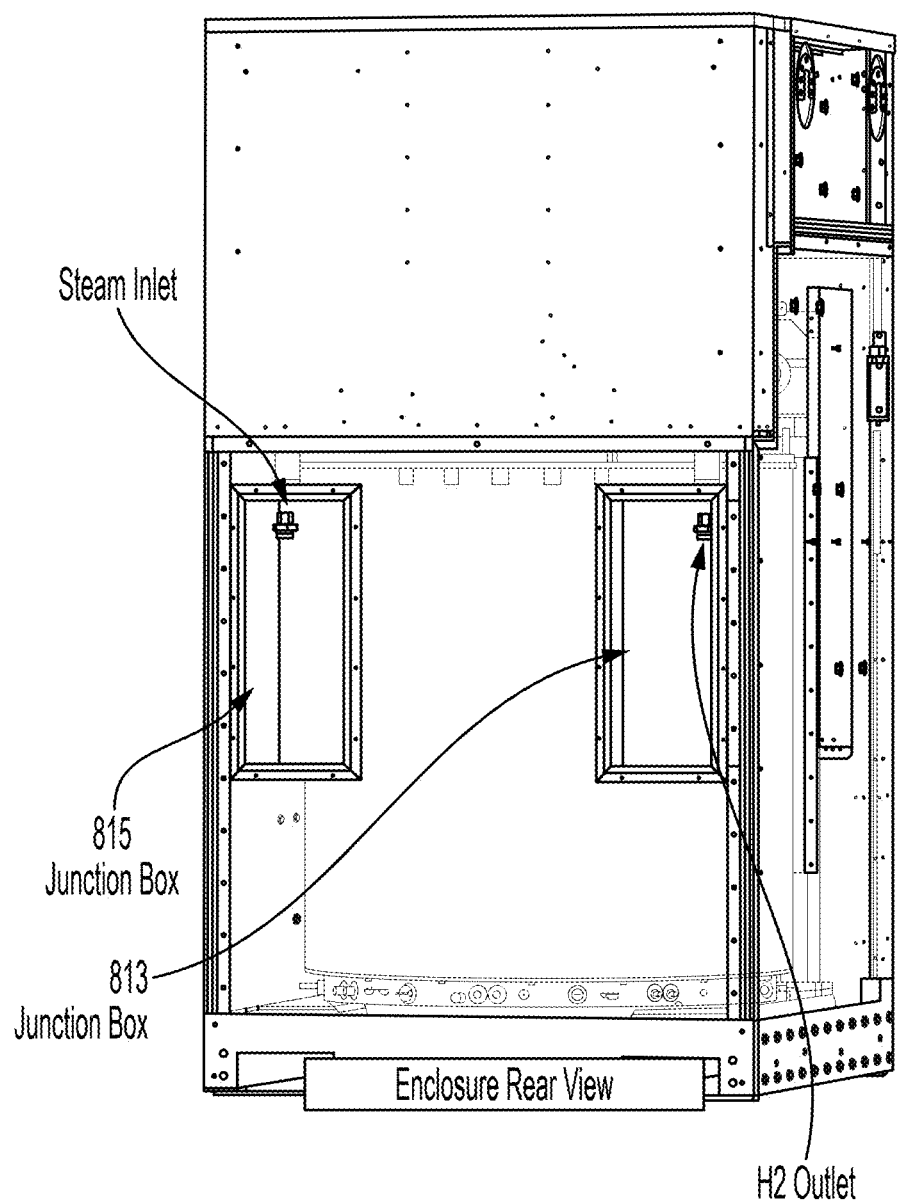
FIG. 9B illustrates outlet hydrogen product at rear plumbing junction box and steam inlet at rear plumbing junction box according to an example embodiment of the present invention.

Returning to FIG. 8, generator module 800 supports both internal steam and external steam configurations. Generator module 800 further supports the capability to switch between internal and external steam sources. Inlet steam may be supplied at rear plumbing junction box 813 or another junction box. For example, FIG. 9B illustrates outlet hydrogen product at rear plumbing junction box 813 and steam inlet at rear plumbing junction box 815 according to an example embodiment of the present invention. Either junction box 813 or 815 can include a flexible hose for ease of connections. These junction boxes do not increase the generator module 800 footprint. Steam inlet at rear plumbing junction box 815 can be capped if not in use.

Accordingly, safe integration of high voltage power electronics in the same enclosure as fuel generating/consuming element (i.e., the electrolyzer) is achieved. The embodiments enable modular install of the enclosure at a site level. Further, the enclosure is compatible with internal steam or external steam. In addition, the embodiments enable access and connection points for hydrogen out and the optional steam inlet (e.g., external steam) within the modular footprint.

By utilizing the various embodiments of the invention, the connection configurations facilitate a repeatable method and location of connecting several hydrogen generation modules to shared hydrogen collection and shared supply steam. The connection configurations enable a common service aisle and space for hydrogen collection/steam supply behind a back to back or linear configuration of hydrogen generation modules. This enables the site design to easily be scaled with more or fewer hydrogen generation modules.

It will be apparent to those skilled in the art that various modifications and variations can be made in the modular electrolyzer system of the present invention without departing from the spirit or scope of the invention. Thus, it is intended that the present invention cover the modifications and variations of this invention provided they come within the scope of the appended claims and their equivalents.

What is claimed is:

1. A modular electrolyzer system, comprising:
a plurality of generator modules, each of the plurality of generator modules including electrolyzer cells disposed in a hotbox, the electrolyzer cells configured to generate a hydrogen product by electrolyzing steam provided to the electrolyzer cells; and
hydrogen product piping configured to receive the hydrogen product from hydrogen outlet connections of the plurality of generator modules and to inhibit the backflow of a hydrogen product condensate to the plurality of generator modules,
wherein the hydrogen product piping extends adjacent to ventilation modules of the generator modules, and the hydrogen piping is configured to be heated by exhaust outputs of the ventilation modules to inhibit formation of the hydrogen product condensate.

2. The modular electrolyzer system of claim 1, further comprising a base having a steel overlay wherein plumbing components and electrical components are disposed between the base and the plurality of generator modules.

3. The modular electrolyzer system of claim 1, further comprising a gas distribution module configured to supply the plurality of generator modules with hydrogen at startup of the system.

4. The modular electrolyzer system of claim 3, wherein the gas distribution module is configured to detect at least one safety event, and stop supply of the hydrogen in response to the safety event.

5. The modular electrolyzer system of claim 3, wherein the gas distribution module further includes at least one of a pressure detector, a thermal detector, a gas safety shutoff, and a purge gas distributor.

6. The modular electrolyzer system of claim 1, wherein at least one of the plurality of generator modules includes an electrolyzer compartment and an electronics compartment.

7. The modular electrolyzer system of claim 1, wherein the hydrogen product piping is disposed between rows of the plurality of generator modules.

8. The modular electrolyzer system of claim 1, wherein at least one of the plurality of generator modules includes a steam inlet connection.

9. The modular electrolyzer system of claim 1, wherein steam is generated in the plurality of generator modules, or is externally generated and provided to the plurality of generator modules.

10. The modular electrolyzer system of claim 1, wherein:
the hydrogen outlet connections are disposed on an upper surface of each of the plurality of generator modules; and
at least a portion of the hydrogen product piping is disposed above the hydrogen outlet connections.

11. A modular electrolyzer system, comprising:
a plurality of generator modules, each of the plurality of generator modules including electrolyzer cells disposed in a hotbox, and a cabinet housing the hotbox, the electrolyzer cells configured to generate a hydrogen product by electrolyzing steam provided to the electrolyzer cells; and
hydrogen product piping configured to receive the hydrogen product from hydrogen outlet connections of the plurality of generator modules and to inhibit the backflow of a hydrogen product condensate to the plurality of generator modules,
wherein in each of the plurality of generator modules, the hydrogen outlet connection is disposed on a rear surface of the cabinet of the generator module below a hydrogen product outlet of the hotbox to inhibit backflow of the hydrogen product condensate to the hotbox.

12. The modular electrolyzer system of claim 11, wherein:
the outlet connections comprise plumbing junction boxes that are disposed on the rear surfaces of the generator module housings below the hydrogen product outlets of the hotboxes that are located in the generator module housings; and
in each of the generator modules, a portion of the hydrogen product piping extends into the generator module, and the portion of the hydrogen product piping is sloped downward from the hydrogen product outlet of the hotbox to the hydrogen outlet connection to inhibit the backflow of hydrogen product condensate to the hotbox.

13. The modular electrolyzer system of claim 1, wherein:
each of the plurality of generator modules comprises a junction box that is recessed in a rear surface of the generator module;
the hydrogen outlet connections are disposed in the junction boxes; and
steam inlet connections are disposed in the junction boxes.

14. A method of operating a modular electrolyzer system, comprising:
electrolyzing steam in electrolyzer cells to generate a hydrogen product, wherein the electrolyzer cells are disposed in hotboxes which are located in respective cabinets of generator modules;
providing the hydrogen product to hydrogen product piping; and
inhibiting backflow of a hydrogen product condensate to the generator modules through the hydrogen product piping by heating the hydrogen product piping using an exhaust output of a ventilation module of each of the generator modules or by flowing the hydrogen product downward through the hydrogen product piping in the cabinets of the generator modules.

15. The method of claim 14, wherein the hydrogen product piping extends adjacent to the ventilation module of each of the generator modules and the hydrogen piping is heated by the exhaust output of the ventilation module to inhibit formation of the hydrogen product condensate.

16. The method of claim 14, wherein in each of the generator modules, a hydrogen outlet connection of the generator module is located below a hydrogen product outlet of the hotbox, and the hydrogen product piping is sloped downward from the hydrogen product outlet of the hotbox to the hydrogen outlet connection to inhibit the backflow of hydrogen product condensate to the hotbox.

17. The method of claim 14, further comprising:
 supplying the generator modules with hydrogen at startup of the modular electrolyzer system;
 detecting at least one safety event; and
 stopping the supply of hydrogen to the generator modules in response to the safety event.

* * * * *